United States Patent [19]

Sasaki

[11] Patent Number: 5,471,390
[45] Date of Patent: Nov. 28, 1995

[54] DIFFERENTIAL LIMITING TORQUE CONTROL SYSTEM FOR AUTOMOTIVE VEHICLES

[75] Inventor: Hiroki Sasaki, Yokohama, Japan

[73] Assignee: Nissan Motor Co., Ltd., Yokohama City, Japan

[21] Appl. No.: 270,829

[22] Filed: Jul. 5, 1994

[30] Foreign Application Priority Data

Jul. 23, 1993 [JP] Japan .................................. 5-182716

[51] Int. Cl.$^6$ ........................................................ B60T 8/52
[52] U.S. Cl. ................... 364/424.05; 364/426.02; 364/426.03; 303/DIG. 6
[58] Field of Search ......................... 364/424.05, 426.02, 364/426.03; 303/95, 96, 97, 100, 101, 112, 103, 111, 104, 93; 180/167

[56] References Cited

U.S. PATENT DOCUMENTS

| 5,019,985 | 5/1991 | Yasuno et al. | 364/426.02 |
| 5,171,070 | 12/1992 | Okazaki et al. | 303/103 |
| 5,207,483 | 5/1993 | Shimada et al. | 303/100 |
| 5,224,765 | 7/1993 | Matsuda | 303/9.62 |
| 5,255,962 | 10/1993 | Neuhaus et al. | 303/111 |
| 5,282,138 | 1/1994 | Sano | 364/426.03 |
| 5,282,674 | 2/1994 | Matsuda | 303/9.71 |

FOREIGN PATENT DOCUMENTS

| 4-72731 | 1/1986 | Japan . |
| 62-110530 | 5/1987 | Japan . |
| 1-101230 | 4/1989 | Japan . |
| 3-67725 | 3/1991 | Japan . |

*Primary Examiner*—Kevin J. Teska
*Assistant Examiner*—Susan Wieland
*Attorney, Agent, or Firm*—Foley & Lardner

[57] ABSTRACT

A differential limiting torque control system for an automotive vehicle with an anti-skid brake control system (ABS) and a limited slip differential (LSD), comprises sensors for detecting a deceleration, a lateral acceleration, and a drive-wheel speed difference between the right and left drive wheels, and an active LSD controller responsive to both the detected deceleration and the detected lateral-acceleration for deriving a first target torque and responsive to the detected drive-wheel speed difference for deriving a second target torque. The controller adjusts a differential limiting torque applied to the LSD to a higher one of the first and second target torques, only during operation of the ABS.

6 Claims, 5 Drawing Sheets

DIFFERENTIAL LIMITING TORQUE CONTROL SYSTEM FOR AUTOMOTIVE VEHICLES

BACKGROUND OF THE INVENTION

1. Field of the Invention

The present invention relates to a differential limiting torque control system for an automotive vehicle employing both a limited slip differential generally abbreviated as a "LSD" and an anti-skid brake control system generally abbreviated as an "ABS", in which a differential limiting torque of the LSD is electronically controlled by adjusting an engaging force of a clutch device operably arranged between a differential case and differential side gears, based on input information representative of an operative state of the ABS.

2. Description of the Prior Art

One such prior art differential limiting torque control system employed in an automotive vehicle with an ABS has been disclosed in Japanese Patent Provisional Publication (Tokkai Showa) No. 62-110530. In the event that the differential limiting torque is acting between the right and left drive road wheels during operation of the ABS, the anti-skid control tends to be affected by unpredicated braking torque which acts on the drive road wheel and is created by the differential limiting operation of the LSD. The unpredicated braking force would increase the possibility of the drive road wheel-lock. In order to avoid the interference between the anti-skid brake control and the differential limiting torque control, the above-mentioned conventional differential limiting control system is so designed as to completely release the differential limiting torque applied to the clutch device of the LSD in case that the anti-skid brake control and the differential limiting torque control are both executed concurrently with each other. However, the conventional differential limiting torque control system suffers from the drawback that the vehicle experiences a rapid change in yawing moment about the center of gravity thereof owing to the driving torque difference between the right and left drive wheels, in case that the differential limiting torque is rapidly adjusted to zero concurrently with activation of the ABS (shift to the operative state of the ABS), during moderate or gentle braking on turns with a high-level lateral acceleration exerted on the vehicle body on high frictional roads having a high friction coefficient namely dry pavements, or during gentle braking on turns on a split-µ road wherein one of the right and left drive wheels lies on a high-frictional road surface such as a dry pavement and the other drive wheel lies on a low-frictional road surface such as a muddy road, wet or icy roads. The rapid change in yawing moment would result in unstable behavior of the vehicle body. As is well known, the differential limiting torque control means a control of the yawing moment about the center of gravity of the vehicle body. The previously-noted rapid change in yawing moment deteriorates stability and controllability of the vehicle during braking deceleration on turns. In more recent years, there have been proposed and developed technologies for avoidance of the rapid change in differential limiting torque during operation of the ABS on low-friction roads such as snow or icy roads. For instance, Japanese Patent Second Publication (Tokko Heisei) No. 4-72731 discloses a slip controlling brake system for a four-wheel drive vehicle with a differential limiting device, in which the differential limiting operation is partly or completely released only during operation of the ABS. Such partial release could merely hold the differential limiting torque applied to the differential just before the ABS is switched to an operative state. The partially released differential limiting device cannot always produce a yawing moment enough to compensate the vehicle behavior to understeer positively. For example, assuming that the differential limiting torque held through the partial release is insufficient when the ABS is conditioned in the operative state during braking on turns with a high lateral acceleration on high-friction roads, there is a possibility of unstable vehicle behavior. That is, the insufficient differential limiting torque cannot ensure a stability of the vehicle during braking operation.

SUMMARY OF THE INVENTION

It is, therefore in view of the above disadvantages an object of the present invention to assure a braking stability of the vehicle irrespective of road conditions such as high-friction roads, low-friction roads, or split-µ roads, during operation of an ABS, in an automobile differential limiting torque control system which electronically controls a differential limiting torque acting between right and left drive wheels on the basis of input information indicative of the operative state of the ABS.

It is another object of the invention to provide an improved active differential limiting torque control system which can positively provide a yawing moment required to compensate the vehicle behavior to understeer when an ABS is switched to an operative state owing to braking operation on turns with a high-level lateral acceleration exerted on the vehicle body on high frictional roads having a high coefficient of friction, or during gentle braking on turns on split-µ roads, while avoiding the interference between an anti-skid brake control and a differential limiting torque control.

In order to accomplish the aforementioned and other objects of the invention, a differential limiting torque control system for an automotive vehicle with an anti-skid brake control device suppressing wheel lock by adjusting a brake-fluid pressure in a road wheel cylinder during braking, comprises differential limiting means arranged between right and left drive road wheels, for producing a differential limiting torque through which a differential action is limited, sensor means for detecting a deceleration, a lateral acceleration, and a drive-wheel speed difference between the right and left drive wheels, first derivation means responsive to both the detected deceleration and the detected lateral-acceleration for deriving a first target torque, second derivation means responsive to the detected drive-wheel speed difference for deriving a second target torque, and control means for controlling the differential limiting means to adjust the produced differential limiting torque to a higher one of the first and second target torques, only when the anti-skid brake control means is conditioned in an operative state.

According to another aspect of the invention, a differential limiting torque control system for an automotive vehicle with an anti-skid brake control device suppressing wheel lock by adjusting a brake-fluid pressure in a road wheel cylinder during braking, comprises differential limiting means arranged between right and left drive road wheels, for producing a differential limiting torque through which a differential action is limited, sensor means for detecting a deceleration, a lateral acceleration, a vehicle speed and a drive-wheel speed difference between the right and left drive wheels, first derivation means responsive to both the detected deceleration and the detected lateral-acceleration, for deriving a first target torque having a specified torque characteristic according to which the first target torque is increased in accordance with the detected deceleration until the first target torque reaches a lateral-acceleration dependent torque limit, second derivation means responsive to the detected drive-wheel speed difference, for deriving a second target torque having a specified torque characteristic according to which the second target torque is increased in accordance with the detected drive-wheel speed difference until the second target torque reaches a vehicle speed dependent torque limit, and control means for controlling the differential limiting means to adjust the produced differential limiting torque to a higher one of the first and second target torques only when the anti-skid brake control means is conditioned in an operative state.

According to a further aspect of the invention, a differential limiting torque control system for an automotive vehicle with at least two-channel anti-skid brake control device in which two brake-fluid pressures respectively applied to a front driven-wheel side and to a rear drive-wheel side are adjusted independently of each other, comprises differential limiting means arranged between right and left drive road wheels, for producing a differential limiting torque through which a differential action is limited, sensor means for detecting a deceleration, a lateral acceleration, and a drive-wheel speed difference between the right and left drive wheels, first derivation means responsive to both the detected deceleration and the detected lateral-acceleration for deriving a first target torque, second derivation means responsive to the detected drive-wheel speed difference for deriving a second target torque, means for determining whether an anti-skid control of the anti-skid brake control device is executed at least on the rear drive-wheel side during operation of the anti-skid brake control device, and for switching a flag on when the anti-skid control is executed at least on the rear drive-wheel side, and control means for controlling the differential limiting means to adjust the produced differential limiting torque to a higher one of the first and second target torques when the flag is off, and to the second target torque when the flag is on. Two different torque characteristics of the first and second target torques are coordinated with each other, so that the derived first target torque exceeds the derived second target torque during cornering of the vehicle on a high-μ road surface having a high coefficient of friction with a high lateral acceleration and that the derived second target torque exceeds the derived first target torque during driving of the vehicle on a low-μ road surface having a low coefficient of friction or a split-μ road wherein one of the right and left drive wheels lies on a high-μ road surface and the other drive wheel lies on a low-μ road surface. With the above-noted arrangement, a braking stability (vehicle behavior) and a handling performance are improved during braking under various road conditions, namely on high-μ roads, low-μ roads, and split-μ roads.

DESCRIPTION OF THE PREFERRED EMBODIMENTS

Figure 1:
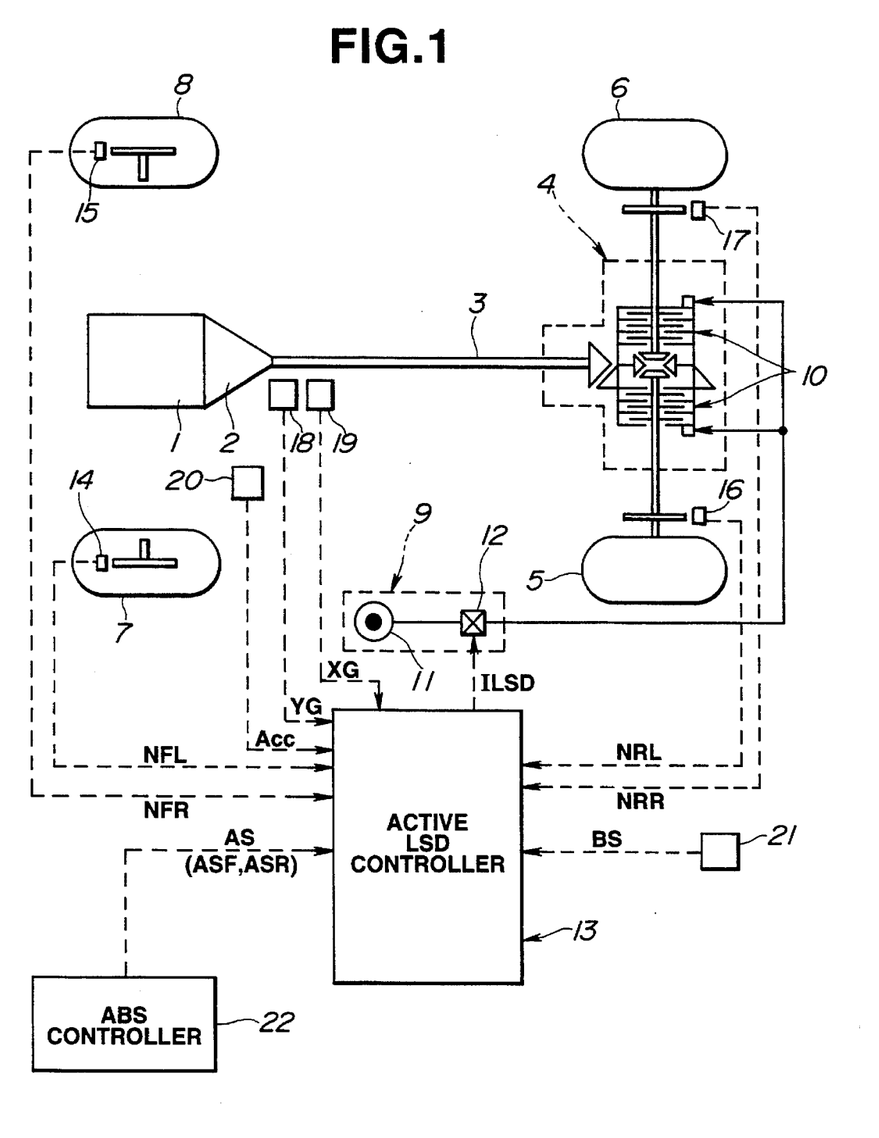
FIG. 1 is a schematic system diagram of a rear-wheel drive vehicle with a differential limiting torque control system according to the invention.

Referring now to the drawings, particularly to FIG. 1, the differential limiting torque control system of the invention is exemplified in case of a rear-wheel drive vehicle. As seen in FIG. 1, reference numerals 1, 2, 3 and 4 designate an internal combustion engine, a transmission, a propeller shaft and an electronically controlled limited slip differential hereinbelow abbreviated as a "LSD", respectively. Reference numerals 5 and 6 denote rear-left and rear-right drive road wheels, while reference numerals 7 and 8 denote front-left and front-right road wheels. The LSD 4 includes a hydraulically-operated multiple-disc type differential limiting clutch 10 which produces a differential limiting torque between the two rear drive wheels 7 and 8 in response to a clutch control pressure produced by a hydraulic unit 9. The hydraulic unit 9 includes a hydraulic pressure source 11 and a LSD control valve 12. The hydraulic unit 9 and the differential limiting clutch 10 are cooperative to each other to provide a controlled differential limiting torque. The LSD control valve 12 is responsive to a value of a control current ILSD generated from an active LSD controller 13 constituting a most important component of the differential limiting torque control system according to the invention, to produce a required clutch control pressure for the differential limiting clutch 10. The active LSD controller 13 receives input information from various sensors, namely a front-left wheel revolution speed NFL detected by a front-left wheel speed sensor 14, a front-right wheel revolution speed NFR detected by a right-front wheel speed sensor 15, a rear-left wheel revolution speed NRL detected by a rear-left wheel speed sensor 16, a rear-right wheel revolution speed NRR detected by a rear-right wheel speed sensor 17, a lateral acceleration YG detected by a lateral acceleration sensor 18, a longitudinal acceleration XG detected by a longitudinal acceleration sensor 19, an accel-opening Acc detected by an acceleration opening sensor 20, a switch signal BS produced by a brake switch 21, and an ABS operative-state indicative flag AS produced by an ABS controller 22 executing an anti-skid brake control according to which maximum effective braking is provided. For the sake of illustrative simplicity, although it is not clearly shown in FIG. 1, the active LSD controller 13 includes a select-LOW comparator which performs a selection procedure between front-left and front-right wheel speeds in step 31 and a select-HIGH comparator which performs a decision procedure in step 39 of the flow diagram shown in FIG. 2, as hereinbelow described in detail. In the embodiment, a multi-channel type ABS controller which executes an anti-skid brake control independently to each of road wheel areas relating to the channel number is used as the ABS controller 22 which can prevent wheel-lock by controlling a brake-fluid pressure. For instance, in a two-channel type ABS controller, two brake-fluid pressures respectively applied to the front-wheel side and to the rear-wheel side are adjusted independently of each other. In a three-channel type ABS controller, three brake-fluid pressures respectively applied to the front-left wheel side, to the front-right wheel side, and to the rear-wheel side are adjusted independently of each other. In a four-channel type ABS controller, four brake-fluid pressure respectively applied to the front-left wheel side, to the front-right wheel side, to the rear-left wheel side and to the rear-right wheel side are adjusted independently of each other. The operation of the active LSD controller 13 is explained in accordance with the control flow illustrated in FIG. 2.

Figure 2:
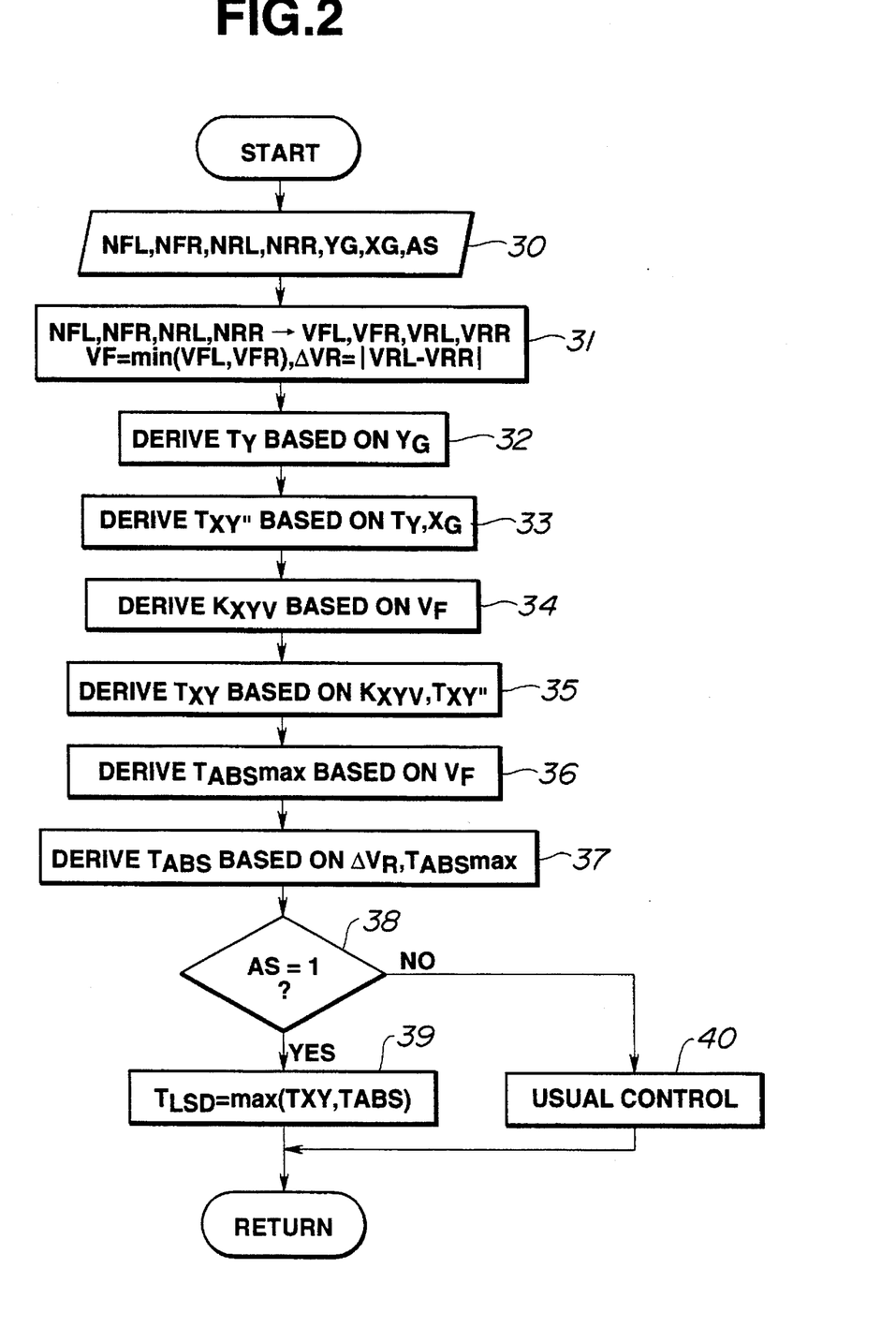
FIG. 2 is a flow chart illustrating a control procedure of the differential limiting torque control executed by the differential limiting torque control system shown in FIG. 1.

Referring now to FIG. 2, the control routine is executed as time-triggered interrupt routines to be triggered every predetermined time intervals, such as 10 msec.

In step 30, the LSD controller 13 reads out the four detected wheel revolution speeds NFL, NFR, NRL, NRR, and the detected lateral acceleration YG, the detected longitudinal acceleration XG, and the ABS operative-state indicative flag AS.

In step 31, the wheel revolution speeds NFL, NFR, NRL, NRR are replaced respectively as front-left, front-right, rear-left and rear-right wheel speeds VFL, VFR, VRL and VRR. The controller 13 selects the lower one of the two front wheel speeds VFL and VFR as a vehicle speed VF, by way of the select-LOW comparator. In addition, in this step, the wheel speed difference $\Delta VR$ is obtained as the absolute value of the difference between the right and left drive wheels VRL and VRR.

Figure 3:
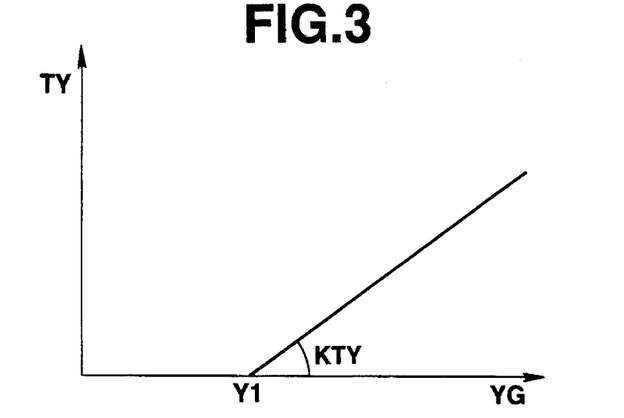
FIG. 3 is a graph illustrating a lateral-acceleration responsive torque characteristic.

In step 32, a lateral-acceleration responsive torque TY is derived depending on the detected lateral acceleration YG in accordance with the characteristic shown in FIG. 3. The characteristic of FIG. 3 is defined by a specified offset value Y1 of the lateral acceleration and a proportional gain KTY for the lateral-acceleration responsive torque TY. These factors Y1 and KTY are tuning constants which are optimally selected depending on various types of automotive vehicles and on a specified control objective. The lateral-acceleration responsive torque TY increases in direct proportion to the lateral acceleration YG in case of the lateral acceleration above the offset value Y1. As clearly seen in FIG. 3, the lateral-acceleration responsive torque TY is held zero in case of the lateral acceleration below the offset value Y1.

Figure 4:
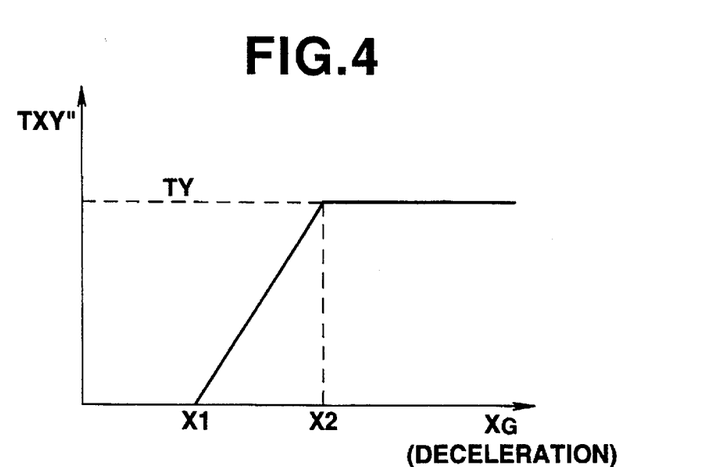
FIG. 4 is a graph illustrating a longitudinal-G and lateral-G responsive torque characteristic.

In step 33, a longitudinal-G and lateral-G responsive torque TXY" is derived on the basis of the lateral-acceleration responsive torque TY derived in step 32 and the detected longitudinal acceleration XG in accordance with the characteristic illustrated in FIG. 4. The characteristic of FIG. 4 is defined by a first specified longitudinal-G threshold X1, a second specified longitudinal-G threshold X2, and the derived lateral-acceleration responsive torque TY. Note that the longitudinal acceleration XG means a deceleration exerted on the vehicle body during braking. These factors X1 and X2 are also tuning constants. The longitudinal-G and lateral-G responsive torque TXY" is held zero in a small deceleration region below the first longitudinal-G threshold X1, and increased in direct proportion to the longitudinal G (deceleration) in a medium deceleration region between the two thresholds X1 and X2, and constantly held at the upper limit, namely the lateral-acceleration responsive torque value TY in a high deceleration region above the second longitudinal-G threshold X2. As appreciated, the maximum value of the longitudinal-G and lateral-G responsive torque TXY" is limited by the derived lateral-acceleration responsive torque TY.

Figure 5:
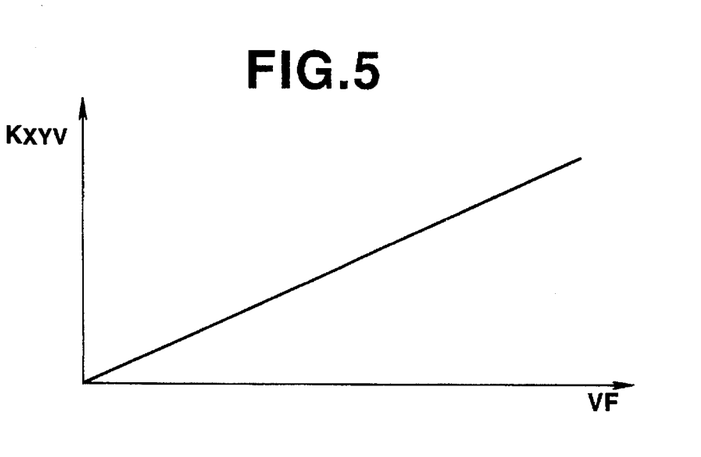
FIG. 5 is a graph illustrating a vehicle-speed dependent proportional gain KXYV characteristic.

In step 34, the vehicle-speed dependent proportional gain KXYV is derived on the basis of the vehicle speed VF in accordance with the characteristic illustrated in FIG. 5.

In step 35, a longitudinal-G and lateral-G responsive target torque TXY is calculated and derived on the basis of the derived longitudinal-G and lateral-G responsive torque TXY" and the vehicle-speed dependent proportional gain KXYV, in accordance with the following formula.

$$TXY = KXYV \times TXY''$$

Figure 6:
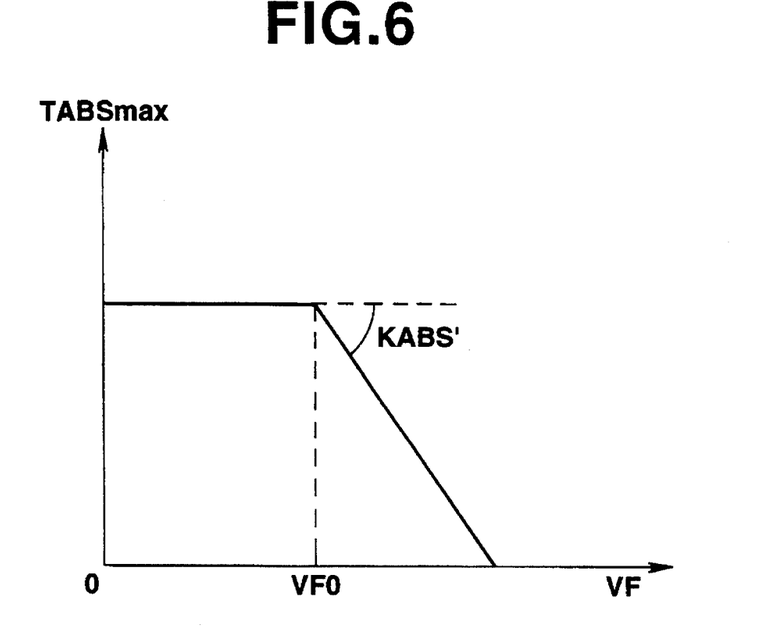
FIG. 6 is a graph illustrating a vehicle-speed versus ABS coordinated maximum torque characteristic.

In step 36, an ABS coordinated maximum torque TABSmax is derived depending on the vehicle speed VF in accordance with the characteristic illustrated in FIG. 6. As appreciated from the characteristic of FIG. 6, the ABS coordinated maximum torque TABSmax is maintained at a predetermined constant torque value at the vehicle speed VF below a preselected vehicle speed VF0 such as 80 km/h, and decreased with a predetermined negative proportional gain KABS' in accordance with an increase in the vehicle speed in a vehicle speed region (VF≧VF0) above the preselected vehicle speed VF0. The two factors VF0 and KABS' are tuning constants.

Figure 7:
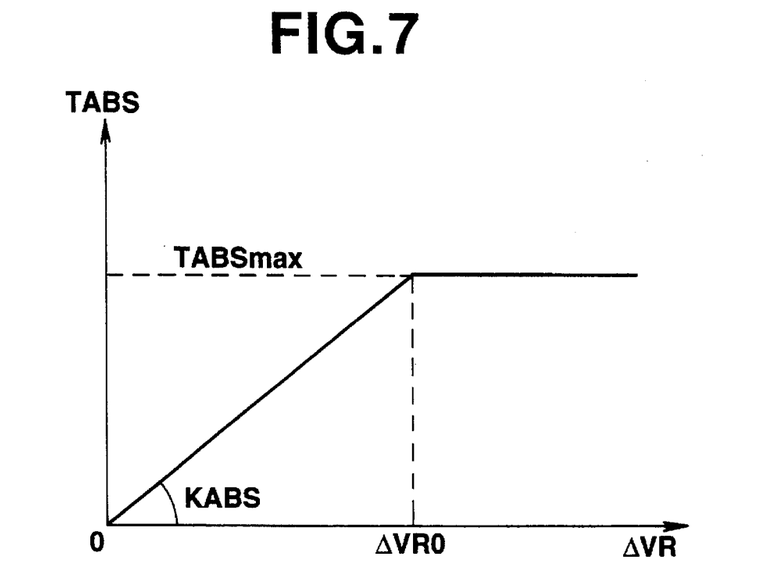
FIG. 7 is a graph illustrating an ABS coordinated target torque characteristic.

In step 37, an ABS coordinated target torque TABS is derived on the basis of the drive-wheel speed difference $\Delta VR$ and the derived ABS coordinated maximum torque TABSmax, in accordance with the characteristic illustrated in FIG. 7. The characteristic of FIG. 7 is defined by a specified wheel-speed difference threshold $\Delta VR0$, a predetermined proportional gain KABS, and the derived ABS coordinated maximum torque TABSmax. The above-noted two factors $\Delta VR0$ and KABS are tuning constants. The ABS coordinated target torque TABS is gradually increased in direct proportion to the wheel-speed difference $\Delta VR$ in a wheel-speed difference region ($0 < \Delta VR < \Delta VR0$) below the threshold $\Delta VR0$, and constantly held at the ABS coordinated maximum torque value TABSmax in a wheel-speed difference region ($\Delta VR0 \leq \Delta VR$) above the threshold $\Delta VR0$.

In step 38, a test is made to determine as to whether the ABS operative-state indicative flag AS is set (on), namely AS=1. When the answer to step 38 is affirmative (AS=1), step 39 proceeds in which a target differential limiting torque TLSD is derived by selecting the higher one of the derived longitudinal-G and lateral-G responsive target torque TXY and the derived ABS coordinated target torque TABS through a select-HIGH process which is executed by the select-HIGH comparator employed in the controller 13. Thus, the controller 13 produces a control command to the LSD 4 so as to adjust the differential limiting torque towards the target differential limiting torque value. As explained later, the selection of the higher one of the derived two target torque values TXY and TABS is advantageous to enhance braking stability and to provide optimum handling performance, during operation of the ABS.

Returning to step 38, when the ABS operative-state indicative flag AS is off (not set), namely AS=0, the active LSD controller 13 executes a usual differential limiting control in step 40. The usual control of step 40 is executed by selecting the higher one of the lateral-acceleration responsive torque, the throttle-opening responsive torque, the drive-wheel difference responsive torque, and the like, as the target differential limiting torque. The throttle-opening responsive torque is generally set to be proportional to the throttle opening, while the drive-wheel difference responsive torque is set to be proportional to the drive-wheel speed difference, in a conventional manner. The usual differential limiting torque control is advantageous to prevent understeer tendencies at the beginning of the vehicle turn with a small lateral acceleration and a small throttle-opening, and to enhance an acceleration performance and an accel-controllability on turns in the presence of depressing operation of the accelerator pedal and to ensure a stable vehicle behavior and vehicle attitude during starting or accelerating on low-friction roads, due to the target differential limiting torque taking all of a change in the lateral acceleration, a change in the throttle-opening, and a change in the drive-wheel speed difference into account.

The aim in providing the longitudinal-G and lateral-G responsive target torque TXY (=KXYV×TXY") as a selectable one of the two derived target torques required for determination of the target differential limiting torque, is hereinafter described in detail.

In the event that the vehicle is turning to the right or the left on high-friction roads in the presence of braking operation and additionally the ABS is conditioned in the inoperative state, a relatively large lateral acceleration YG and a certain magnitude of the longitudinal acceleration XG (braking deceleration) based on depression of the brake pedal, both tend to develop. Thus, the longitudinal-G and lateral-G responsive target torque TXY may be set to a relatively high level owing to the relatively large lateral acceleration and the deceleration. If the longitudinal-G and lateral-G responsive target torque TXY is selected, the controlled differential limiting torque is increasingly adjusted in response to both the lateral G and the longitudinal G (deceleration), with the result that the increased differential limiting torque compensates the vehicle behavior towards understeer by virtue of a yawing moment about the center of gravity of the vehicle. This enhances a braking stability during cornering on the high-friction roads in the inoperative state of the ABS.

On the other hand, in the event that the vehicle is turning on high-friction roads in the presence of braking operation and additionally the ABS is conditioned in the operative state, the high-µ road permits the road tire to get a better gripping and thus the lateral acceleration and the longitudinal acceleration both can develop toward a high level. Under these conditions, although the conventional differential limiting control system completely or partly release the differential limiting torque to prevent both the left and right drive wheels from locking simultaneously, the system according to the invention positively acts to increasingly adjust the differential limiting torque even in the operative state of the ABS, as if the same is increasingly adjusted during usual braking on turn with a high lateral acceleration and a great deceleration. The positive shifting control of the differential limiting torque to a higher level enhances a stability of the vehicle behavior, as compared with the prior-art shifting control of the same to a lower level during operation of the ABS. This was assured by the inventor of the present invention. As explained above, the aim of the differential limiting torque control based on the longitudinal-G and lateral-G responsive target torque TXY is to ensure a high braking stability during cornering on high-µ roads, irrespective of whether the ABS is operative or inoperative.

During the anti-skid brake control, the aim in providing the ABS coordinated target torque TABS as a selectable one of the derived two target torques required for determination of the target differential limiting torque, is hereinafter described in detail.

(i) In setting in the ABS coordinated target torque TABS, the target torque TABS is so designed to be a lower level than the target torque value derived through the usual differential limiting control executed in step 40. As is generally known, the greater the differential limiting torque applied to the clutch 10, the greater the inertial mass of the rear drive wheel system which includes the two rear drive wheels and the rear-wheel drive axles, by way of a more rigid connection between the right and left drive wheels. In other words, the smaller the differential limiting torque, the smaller the virtual inertial mass of the rear drive wheel. Supposing that the ABS coordinated target torque TABS is designed to be set to a higher or equal level as compared with the target torque value derived through the usual differential limiting control, the virtual inertial mass of the rear drive wheel may become great, with the result that it takes a relatively long time until the brake-fluid pressure has reached a target pressure value calculated by the ABS. Accordingly, this results in a relatively long braking distance. In view of the above, it is undesirable to set the ABS coordinated target torque TABS to a higher level than the usual target torque value derived in the conventional manner. As appreciated from the above, with the ABS coordinated target torque TABS set at a comparatively lower level, the accuracy of the anti-skid brake control is enhanced because of a small virtual inertial mass of the rear drive wheel. Such high-accuracy control operation of the ABS contributes satisfactorily to prevent wheel lock, thereby ensuring a high stability of the vehicle behavior.

(ii) The steering effort required is successfully reduced and the handling performance is improved, during cornering on low-µ roads such as snow or icy roads, in the presence of depression of the brake pedal, since the ABS coordinated target torque TABS is designed to be proportional to the drive-wheel speed difference ΔVR as seen in FIG. 7. Thus, the wheel speed difference ΔVR is, in general, small at the beginning of the vehicle turning operation. Accordingly, the differential limiting torque is also adjusted at a small level and as a result understeer tendencies are prevented at the beginning of the vehicle turning operation. The braking performance and the braking stability are also enhanced during driving on split-µ roads owing to the ABS coordinated target torque TABS proportional to the drive-wheel speed difference ΔVR, since the differential limiting torque control based on the ABS coordinated target torque TABS operates to properly reduce the wheel speed difference ΔVR.

(iii) Since the ABS coordinated maximum torque TABSmax is varied depending on the vehicle speed VF, as seen in FIG. 6, the braking distance is reduced in a low-speed region wherein the steering correction can be easily achieved, whereas the braking stability is enhanced in a high-speed region wherein the steering correction is hard. As set forth above, the aim in the differential limiting torque control based on the ABS coordinated target torque TABS is to ensure a high braking stability during operation of the ABS, insuring a high control accuracy of the anti-skid brake control. That is, the ABS coordinated target torque is so designed to be congenially and suitably coordinated to the operation of the ABS.

The system according to the invention operates as follows.

When the vehicle is turning on high-µ roads with a high lateral acceleration, more of the car weight is transferred to the outer wheels and thus the car weight becomes less at the inner wheels owing to such road shift. As appreciated, the lower-loaded inner wheel (less-traction wheel) tends to easily lock by light braking. Under these conditions, the ABS can be shifted from the inoperative state to the operative state. The control procedure of FIG. 2 flows from step 30, through steps 31, 32, 33, 34, 35, 36, 37 and 38 to step 39. In order to positively apply a relatively high-level differential limiting torque between the right and left drive wheels, it is important that the target differential limiting torque TLSD is obtained by selecting the higher one of the two target torques TXY and TABS through the select-HIGH process in the select-HIGH comparator of the controller 13 in step 39. During braking in the vehicle-turning state on high-μ roads, since the lateral acceleration YG and the longitudinal acceleration XG (deceleration) both tend to develop greatly, the longitudinal-G and lateral-G responsive target torque TXY is in general set to a greater value than the ABS coordinated target torque TABS. Accordingly, the longitudinal-G and lateral-G responsive target torque TXY can be selected as the target differential limiting torque TLSD. According to the differential limiting torque control based on the longitudinal-G and lateral-G responsive target torque TXY, the differential limiting torque applied to the clutch 10 is not completely released, but maintained at a substantially constant torque value almost equal to the differential limiting torque applied just before shifting to the operative state of the ABS, with the result that a rapid change in the vehicle behavior is certainly avoided and additionally the developed yawing moment about the center of gravity of the vehicle acts to positively shift the vehicle behavior to understeer owing to the braking torque which is transferred from the lower-loaded inner wheel (less-traction wheel) to the higher-loaded outer wheel (great-traction wheel) by virtue of a positive application of the relatively high-level differential limiting torque. Therefore, in the event that the ABS is conditioned in the operative state during braking in the vehicle turning state on high-μ roads with a high lateral acceleration, a high braking stability is ensured according to the torque control based on the longitudinal-G and lateral-G responsive torque.

During braking on low-friction roads such as wet, snow or icy roads, or during braking on split-μ roads, the road wheel tends to easily lock even when the brakes are applied lightly. Thus, the ABS can be activated. In this case, the ABS coordinated target torque TABS may be selected as the target differential limiting torque TLSD through the select-HIGH process of step 39 of FIG. 2, because the lateral acceleration YG and the longitudinal acceleration XG (deceleration) are, on the one hand, retained at a relatively low level, and the drive-wheel speed difference ΔVR tends to greatly develop. Accordingly, the active LSD controller 13 controls the clutch 10 to adjust the differential limiting torque towards the ABS coordinated target torque TABS. As appreciated, according to the differential limiting torque control based on the ABS coordinated target torque TABS, a high braking stability is ensured during braking on low-μ roads without sacrificing the control accuracy of the anti-skid brake control, because of the proper reduction of the drive-wheel speed difference.

As will be appreciated from the above, since the target differential limiting torque TLSD is determined by selecting the higher one of the longitudinal-G and lateral-G responsive target torque TXY and the ABS coordinated target torque TABS through the select-HIGH process during operation of the ABS, the braking stability can be ensured under various road conditions, namely on high-μ roads, on low-μ roads and on split-μ roads. The higher one of the two derived target torques TXY and TABS will be hereinafter referred to as a "select-HIGH torque".

Figure 8:
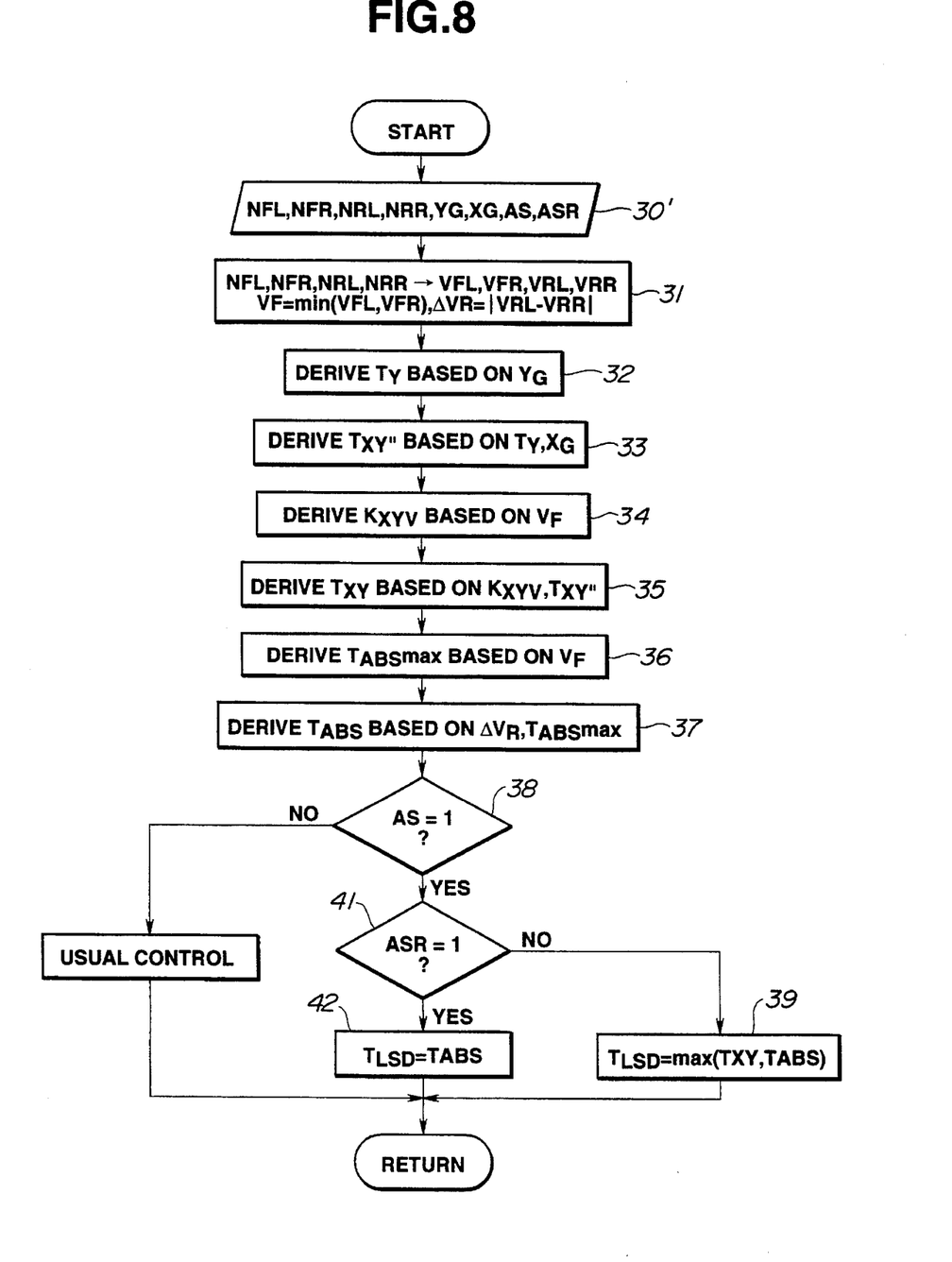
FIG. 8 is a flow chart illustrating a control procedure of the differential limiting torque control executed by a modification of the differential limiting torque control system according to the invention.

Referring now to FIG. 8, there is shown another control diagram executed by a modification of the differential limiting torque control system according to the invention. The basic construction of the system of the modification is similar to that of the embodiment as shown in FIGS. 1 to 7. The active LSD controller of the modification further includes an input interface which can separately receive a rear drive-wheel side ABS operative-state indicative flag ASR and a front-wheel side ABS operative-state indicative flag ASF. The two flags ASR and ASF are generally referred to as an "ABS operative-state indicative flag AS". The modification executing the control flow illustrated in FIG. 8 is different from the previously-explained embodiment executing the flow illustrated in FIG. 2, in that a rear-wheel side ABS operative-state indicative flag ASR is further derived in step 30' in addition to the signals NFL, NFR, NRR, YG, XG and AS, and that steps 40 and 41 are newly added. In step 40, a test is made to determine as to whether the rear-wheel side ABS operative-state indicative flag ASR is set (on), namely ASR=1. In step 42, the target differential limiting torque TLSD is updated by the ABS coordinated target torque TABS, irrespective of comparison results between the longitudinal-G and lateral-G responsive target torque TXY and the ABS coordinated target torque TABS. The remaining steps in FIG. 8 are completely identical to those in FIG. 2. The active LSD controller of the modification operates as follows.

In step 38, when the ABS is conditioned in the operative state, i.e., AS=1, step 41 proceeds. In step 41, a test is made to determine as to whether only the ABS related to the front-wheel side is conditioned in the operative state, namely ASR=0 (ASF= 1), or at least the ABS related to the rear drive-wheel side is conditioned in the operative state, namely ASR=1. That is, the flag state ASR=0 means that the rear drive-wheels still get adequate gripping (great traction) on the roads, while the flag state ASR=1 means that the rear drive-wheels get less gripping (less traction) on the roads. When the answer to step 41 is negative (ASR=0), step 39 proceeds in which the target differential limiting torque TLSD is obtained by selecting the higher one of the two target torques TXY and TABS through the select-HIGH process. In contrast, when the answer to step 41 is affirmative (ASR=1), step 42 proceeds in which the ABS coordinated target torque TABS is set as the target differential limiting torque TLSD. As set forth above, the system of the modification of FIG. 8 is more advantaged than that of the embodiment of FIGS. 1 to 7, because the differential limiting torque control system of the modification decides the target differential limiting torque TLSD in consideration of the gripping state (magnitude of traction) of the drive wheel on the road surface, such that the controller 13 performs the differential limiting torque control based on the select-HIGH torque selected from the two target torques TXY and TABS in case that the drive wheels get adequate gripping (great traction) on the road surface, namely AS=1 and ASR=0, and performs the differential limiting torque control based on the ABS coordinated target torque TABS in case that the drive wheels get less gripping (poor traction) on the road surface, namely AS=1 and ASR=1. In the former case (ASR=0), the differential limiting torque is positively applied to the clutch 10 and held at a high level owing to the select-HIGH torque, with the result that the yawing moment about the center of gravity of the vehicle body is positively adjusted to properly compensate the vehicle behavior towards understeer and consequently the braking stability is enhanced. In the latter case (ASR=1), the differential limiting torque is updated by the ABS coordinated target torque TABS, irrespective of the magnitude relationship between the two derived target torques TXY and TABS, with the result that the braking stability is more effectively enhanced by properly adjusting the differential limiting torque on the basis of the ABS coordinated target torque TABS, while insuring a high accuracy of the anti-skid brake control, during operation of the ABS. One example that the anti-skid brake control to the rear drive-wheel follows after starting the anti-skid brake control to the front wheel, is hereinbelow described. For instance, during gentle braking in the vehicle turning state with a high lateral acceleration, the vehicle experiences rolling, and thus more of the car-weight is transferred to the cornering outer wheels. Thus, loads on the inner wheels are reduced. Assuming that there is the rolling-rigidity difference between front and rear halves of the vehicle and additionally the rolling rigidity of the front half is less than that of the rear half, the car-weight distribution to the front inner-wheel side tends to be less than that to the rear inner-wheel side during rolling. The front wheels tend to lock before the occurrence of the rear-wheel locking, and thus the anti-skid brake control operation for the front wheel side may be initiated rather than the rear-wheel side. Owing to the rolling rigidity difference, the differential limiting control is first performed according to the control flow from step 41 to step 39. Second, the differential limiting control is performed according to the control flow from step 41 to step 42.

As will be appreciated from the above, in the differential limiting control system of the modification which electronically controls the differential limiting torque applied between the right and left drive wheels depending upon the ABS operative and inoperative states, the target differential limiting torque TLSD is set to the select-HIGH torque in case of the operative state of only the ABS related to the front wheel side, and to the ABS coordinated target torque TABS in case of the operative state of only the ABS related to the rear drive-wheel side. In this manner, since the timing of the differential limiting torque control based on the select-HIGH torque is so limited to be performed only when the drive wheels get adequate gripping (good traction) on the road surface during operation of the ABS, a braking stability can be more effectively enhanced during driving under various road conditions, such as on high-$\mu$ roads, on low-$\mu$ roads and on split-$\mu$ roads.

In the embodiment, although a hydraulically-operated multiple-disc type friction clutch is used as the differential limiting clutch device, the clutch device may be replaced with an electromagnetic clutch which can variably adjust a differential limiting clutch in response to a control signal produced by an active LSD controller.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A differential limiting torque control system for an automotive vehicle with an anti-skid brake control device which operates to suppress wheel lock by adjusting a brake-fluid pressure in a road wheel cylinder during braking, said system comprising:

differential limiting means mounted between right and left drive road wheels, for producing a differential limiting torque through which a differential action is limited;

sensor means for detecting a deceleration of the vehicle, a lateral acceleration exerted on the vehicle, a vehicle speed and a drive-wheel speed difference between said right and left drive road wheels;

first derivation means responsive to both the detected deceleration and the detected lateral-acceleration, for deriving a first target torque having a specified torque characteristic according to which said first target torque is increased in accordance with the detected deceleration;

second derivation means responsive to the detected drive-wheel speed difference, for deriving a second target torque having a specified torque characteristic according to which said second target torque is increased in accordance with the detected drive-wheel speed difference; and control means for controlling said differential limiting means to adjust said differential limiting torque to a higher one of said first and second target torques, only when said anti-skid brake control device is conditioned in an operative state.

2. A differential limiting torque control system for an automotive vehicle with an anti-skid brake control device which operates to suppress wheel lock by adjusting a brake-fluid pressure in a road wheel cylinder during braking, said system comprising:

differential limiting means mounted between right and left drive road wheels, for producing a differential limiting torque through which a differential action is limited;

sensor means for detecting a deceleration of the vehicle, a lateral acceleration exerted on the vehicle, a vehicle speed and a drive-wheel speed difference between said right and left drive road wheels;

first derivation means responsive to both the detected deceleration and the detected lateral-acceleration, for deriving a first target torque having a specified torque characteristic according to which said first target torque is increased in accordance with the detected deceleration until said first target torque reaches a lateral-acceleration dependent torque limit;

second derivation means responsive to the detected drive-wheel speed difference, for deriving a second target torque having a specified torque characteristic according to which said second target torque is increased in accordance with the detected drive-wheel speed difference until said second target torque reaches a vehicle speed dependent torque limit; and control means for controlling said differential limiting means to adjust said differential limiting torque to a higher one of said first and second target torques only when said anti-skid brake control device is conditioned in an operative state.

3. A differential limiting torque control system for an automotive vehicle with an at least two-channel type anti-skid brake control device which operates so that two brake-fluid pressures respectively applied to a front driven-wheel side and to a rear drive-wheel side are adjusted independently of each other, said system comprising:

differential limiting means mounted between right and left drive road wheels, for producing a differential limiting torque through which a differential action is limited;

sensor means for detecting a deceleration of the vehicle, a lateral acceleration exerted on the vehicle, a vehicle speed and a drive-wheel speed difference between said right and left drive road wheels;

first derivation means responsive to both the detected deceleration and the detected lateral-acceleration, for deriving a first target torque having a specified torque characteristic according to which said first target torque is increased in accordance with the detected deceleration;

second derivation means responsive to the detected drive-wheel speed difference, for deriving a second target torque having a specified torque characteristic according to which said second target torque is increased in accordance with the detected drive-wheel speed difference;

means for determining whether an anti-skid control of said anti-skid brake control device is executed at least on the rear drive-wheel side during operation of said anti-skid brake control device, and for switching a flag ON when the anti-skid control is executed at least on the rear drive-wheel side; and control means for controlling said differential limiting means to adjust said differential limiting torque to a higher one of said first and second target torques when said flag is OFF, and to said second target torque when said flag is ON.

4. A differential limiting torque control system for an automotive vehicle with an at least two-channel type anti-skid brake control device which operates so that two brake-fluid pressures respectively applied to a front driven-wheel side and to a rear drive-wheel side are adjusted independently of each other, said system comprising:

differential limiting means mounted between right and left drive road wheels, for producing a differential limiting torque through which a differential action is limited;

sensor means for detecting a deceleration of the vehicle, a lateral acceleration exerted on the vehicle body, a vehicle speed and a drive-wheel speed difference between said right and left drive road wheels;

first derivation means responsive to both the detected deceleration and the detected lateral-acceleration, for deriving a first target torque having a specified torque characteristic according to which said first target torque is increased in accordance with the detected deceleration until said first target torque reaches a lateral-acceleration dependent torque limit;

second derivation means responsive to the detected drive-wheel speed difference, for deriving a second target torque having a specified torque characteristic according to which said second target torque is increased in accordance with the detected drive-wheel speed difference until said second target torque reaches a vehicle speed dependent torque limit;

means for determining whether an anti-skid control of said anti-skid brake control device is executed at least on the rear drive-wheel side during operation of said anti-skid brake control device, and for switching a flag ON when the anti-skid control is executed at least on the rear drive-wheel side; and control means for controlling said differential limiting means to adjust said differential limiting torque to a higher one of said first and second target torques when said flag is OFF, and to said second target torque when said flag is ON.

5. The differential limiting torque control system as set forth in claim 4, wherein said first target torque is increasingly varied in proportion to the detected vehicle speed.

6. A differential limiting torque control system for an automotive vehicle with an at least two-channel type anti-skid brake control device which operates so that two brake-fluid pressures respectively applied to a front driven-wheel side and to a rear drive-wheel side are adjusted independently of each other, said system comprising:

differential limiting means mounted between right and left drive road wheels, for producing a differential limiting torque through which a differential action is limited;

sensor means for detecting a deceleration of the vehicle, a lateral acceleration exerted on the vehicle body, a vehicle speed and a drive-wheel speed difference between said right and left drive road wheels;

first derivation means responsive to both the detected deceleration and the detected lateral-acceleration, for deriving a first target torque having a specified torque characteristic according to which said first target torque is increased in accordance with the detected deceleration until said first target torque reaches a lateral-acceleration dependent torque limit;

second derivation means responsive to the detected drive-wheel speed difference, for deriving a second target torque having a specified torque characteristic according to which said second target torque is increased in accordance with the detected drive-wheel speed difference until said second target torque reaches a vehicle speed dependent torque limit;

means for determining whether an anti-skid control of said anti-skid brake control device is executed at least on the rear drive-wheel side during operation of said anti-skid brake control device, and for switching a flag ON when the anti-skid control is executed at least on the rear drive-wheel side; and control means for controlling said differential limiting means to adjust said differential limiting torque to a higher one of said first and second target torques when said flag is OFF, and to said second target torque when said flag is ON, wherein the specified torque characteristics of said first and second target torques are coordinated with each other, so that the derived first target torque exceeds the derived second target torque during cornering of the vehicle on a high-μ road surface having a high coefficient of friction with a high lateral acceleration and so that the derived second target torque exceeds the derived first target torque during driving of the vehicle on a low-μ road surface having a low coefficient of friction or a split-μ road wherein one of the right and left drive road wheels lies on a high-μ road surface and the other drive road wheel lies on a low-μ road surface.

* * * * *